United States Patent
Changeur et al.

(10) Patent No.: US 6,637,918 B2
(45) Date of Patent: Oct. 28, 2003

(54) LIGHTING OR INDICATOR DEVICE FOR A MOTOR VEHICLE

(75) Inventors: Fabien Changeur, Bobigny Cedex (FR); Jean Paul Drouet, Bobigny Cedex (FR); Régis Duplessy, Châveauroux (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/047,774

(22) Filed: Oct. 23, 2001

(65) Prior Publication Data

US 2002/0126493 A1 Sep. 12, 2002

(30) Foreign Application Priority Data

Oct. 23, 2000 (FR) .............................. 00 13657

(51) Int. Cl.[7] .............................. B60Q 1/00; B60Q 1/26
(52) U.S. Cl. ...................... 362/487; 362/516; 362/521; 362/542; 362/332; 362/545; 362/328
(58) Field of Search .................. 362/487, 498, 362/499, 516, 521, 520, 540, 542, 332, 545, 554, 328, 327

(56) References Cited

U.S. PATENT DOCUMENTS

| | | | |
|---|---|---|---|
| 3,588,492 A | * 6/1971 | Pollock | 362/309 |
| 3,969,621 A | 7/1976 | Ferrell | 240/41.35 |
| 4,680,680 A | 7/1987 | Iwaki | 362/80 |
| 4,791,534 A | * 12/1988 | Lindberg | 362/80 |
| 4,799,137 A | * 1/1989 | Aho | 362/309 |
| 4,874,228 A | * 10/1989 | Aho et al. | 350/345 |
| 4,929,866 A | 5/1990 | Murata et al. | 313/500 |
| 6,036,328 A | * 3/2000 | Ohtsuki et al. | 362/31 |
| 6,095,672 A | 8/2000 | Beninga et al. | 362/545 |
| 6,196,704 B1 | 3/2001 | Gauch et al. | 362/276 |

FOREIGN PATENT DOCUMENTS

| | | |
|---|---|---|
| EP | 0 830 984 | 3/1998 |
| EP | 0 908 666 | 4/1999 |
| EP | 0 952 057 | 10/1999 |
| FR | 1 387 230 | 12/1965 |
| FR | 2 378 234 | 12/1979 |
| FR | 2 695 362 | 3/1994 |
| FR | 2 722 270 | 1/1996 |
| FR | 2 732 932 | 10/1996 |
| JP | 5-89703 | 4/1993 |

OTHER PUBLICATIONS

JP 03254006A, Decorational Lighting Fixture, Nov. 13, 1991, Komatsu.*
French Search Report, May 14, 2001.

* cited by examiner

*Primary Examiner*—Stephen Husar
*Assistant Examiner*—Sharon Payne
(74) *Attorney, Agent, or Firm*—Morgan & Finnegan, LLP

(57) ABSTRACT

The present invention relates to a lighting or indicator device for a motor vehicle, including at least one light source, a reflector and a light-diffusing plate. According to the present invention, the reflector and the light-diffusing plate consist of substantially flat elements forming a small but non-zero angle between them and delimiting between them a prismatic volume.

14 Claims, 5 Drawing Sheets

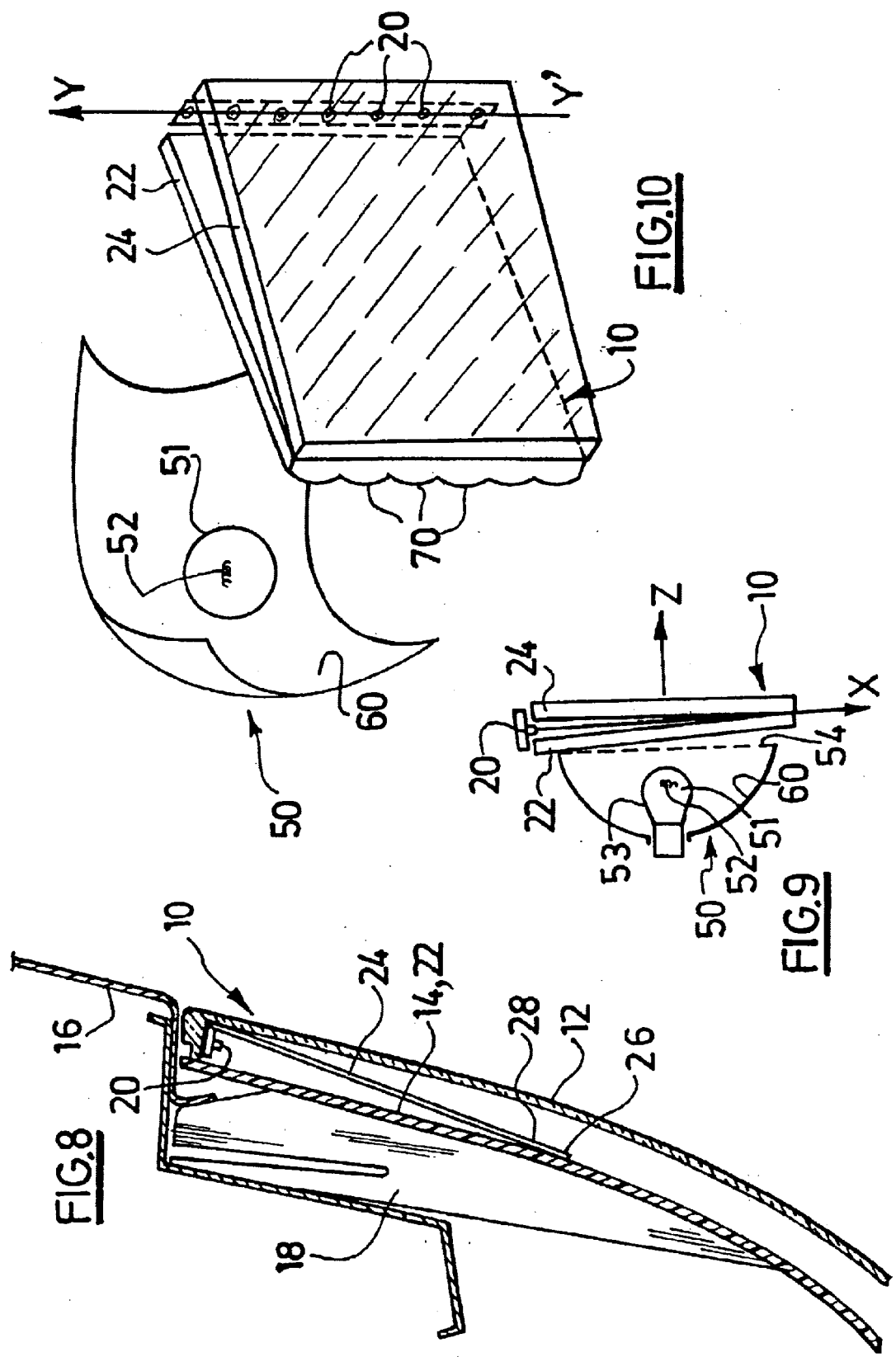

LIGHTING OR INDICATOR DEVICE FOR A MOTOR VEHICLE

FIELD OF THE INVENTION

The present invention relates to indicator devices for a motor vehicle, and more particularly to those which are of the type including a part forming a side return or wing return.

The expression "side return" or "wing return" designates the part of an indicator lamp which is intended to be positioned not on the front or rear face of a vehicle, but on one flank of it, in the region of the part where a wing is connected to this front or rear face.

BACKGROUD OF THE INVENTION

The regulations stipulate or tolerate "lateral repeater" devices, which consist of indicator lamps intended to operate at the same time as a main indicator lamp emitting light forwards or rearwards of the vehicle, the lateral repeater lamp simultaneously emitting light at the side of the vehicle, to the right or to the left. Such lateral repeater lamps, conventionally provided with a light source and with a reflecting mirror mounted in a housing closed by glazing or a bezel, have a minimum specific size which can make them awkward to install on the sides of the vehicle.

Attempts have already been made to solve this problem by providing various means such that the indicator lamp emits light both in a direction substantially parallel to the axis of the vehicle and in a direction substantially perpendicular to the axis of this vehicle, while using only one single light source. For example, document U.S. Pat. No. 3,969,621 describes a lighting device including a light source at the focus of a parabolic reflector, a total-reflection optical component being arranged on the path of at least one half of the light beam, in such a way as to direct this half of the light beam laterally with respect to the vehicle, while the other half can emerge from the lighting device in the axis of the vehicle.

Document FR-A-2 378 234 describes a corner lamp for a motor vehicle including a reflector, a light source and a transparent catadioptric element placed transversely to the axis of the reflector in such a way as to intercept at least a part of the light beam reflected by the reflector, this catadioptric element featuring needles on its inner face which each exhibit, at least in the useful illumination window, at least one facet defining, with the flat outer surface of the catadioptric element, a deviating prism the inclination of which is such that the lamp emits a second illumination flux adjacent to a first flux.

There is also known, from document FR-A-2 695 362, an indicator lamp with lateral visibility, which includes a light source, means for coloring the light originating from this source, a mask including opaque areas and transparent areas distributed in such a way as to attenuate the perception of the coloring means when the lamp is unlit and observed from the outside, the lamp further comprising, in a lateral region of the mask, at least one uncolored transparent bar extending substantially parallel to the overall direction of the beam exiting the mask, the bar forming a light guide for the radiation originating from the source in its direction and possessing a free end face which is inclined so as, by total reflection, to re-emit this radiation in a general direction which is essentially transverse to the overall direction.

The indicator lamps constructed according to the teachings of these documents feature a relatively substantial size, which is dictated by the means used to deflect laterally some of the light emitted in the axis of the vehicle, and the shape of the protection glazing is itself dictated by these deflection means. Such a bulky size of the lamp, and such a shape of the glazing, may often prove to be incompatible with the requirements of the motor-vehicle manufacturers. This is because the space available for installing lighting or indicator devices is more and more restricted, both at the front and at the rear of a modern motor vehicle. Moreover, the constraints of aerodynamics and the ideas of the stylists lead to shapes which are often very different from those which result solely from technical considerations.

It results therefrom, for example, that the glazing of a lighting and/or indicator device may extend into regions where it no longer has any optical function, but solely an aesthetic role, in the concern for continuity of shapes or of lines. It is then usual to arrange, in these regions, between the protection glazing and the bodywork elements of the vehicle, a styling mask provided with an appropriate coating, or, in the absence of a mask, to shape the housing of the lighting or indicator device, which is then visible behind the protection glazing, so that it has the desired appearance.

One example of a lighting and/or indicator device including a part forming a side return in which the protection glazing has no optical function is given by document FR-B-2 732 932, which sets out to solve the problem of making the surface of the side return of the indicator device come as near as possible flush with the level of the surface of the bodywork, when this type of indicator device is mounted on the bodywork.

There is also known from document U.S. Pat. No. 4,680,680 an indicator device in which the regions of the glazing can fulfil different functions, with the aid of colored filters and of Fresnel prisms arranged at 45°.

There are also known, for example from documents EP-A-0 830 984, U.S. Pat. No. 4,929,866 or EP-A-0 908 666, indicator devices in which a plate inclined by a given angle with respect to the exit glazing possesses striations inclined at 45° with respect to the glazing so as to reflect the light rays emitted by light-emitting diodes situated close to the edge of the glazing.

DISCUSSION OF THE INVENTION

The present invention falls within this context, and its object is to provide a lighting or indicator device the size of which, in particular the thickness, is small so as to allow it to be installed easily in the spaces of a vehicle where volume is restricted and where it is nevertheless desired to make available a lighting, indicator or lateral repeater function, such a lighting or indicator device being, moreover, simple to assemble in spaces of restricted volume, reliable in its operation, the photometric performance meeting the regulations in force, and inexpensive.

Thus the object of the present invention is a lighting or indicator device for a motor vehicle, including at least one light source, a reflector and a light-diffusing plate.

According to the present invention, the reflector and the light-diffusing plate consist of smooth, continuous and substantially flat elements forming a small but non-zero angle between them and delimiting between them a substantially prismatic volume.

According to other advantageous and non-limiting characteristics of the invention:

the light source is arranged in the vicinity of the large base of the prismatic volume bounded by the reflector and the light-diffusing plate;

the extremity of the reflector and the extremity of the light-diffusing plate which are furthest from the large base of the prismatic volume are contiguous;

the extremity of the reflector and the extremity of the light-diffusing plate which are furthest from the large base of the prismatic volume are spaced by a length less than the length of the large base of the prismatic volume, the light-diffusing plate is produced from a first transparent material possessing a first refractive index and in which are embedded inclusions made of a second transparent material possessing a second refractive index different from the first one;

the reflector is produced in the form of a transparent plate;

arrangements for deflecting the light are formed on the face of the reflector which is furthest from the light source;

that transparent plate forming the reflector is traversed by the light originating from a second light source;

the second light source interacts with a mirror so as to constitute a lamp of the vehicle;

the reflector and the light-diffusing plate are arranged in a housing, and the reflector consists of a portion of the housing;

the reflector is produced in the form of a plate made from a first transparent material possessing a first refractive index and in which inclusions are embedded made of a second transparent material possessing a second refractive index different from the first one;

one face of the plate forming the reflector, opposite to that which is turned towards the light source, is coated with a light-reflecting material;

the light source consists of a plurality of light-emitting diodes;

the light source consists of a plurality of incandescent bulbs;

the light source consists of a fluorescent tube.

Other objects, characteristics and advantages of the present invention will emerge clearly from the description which will now be given of an embodiment given in a non-limiting way by reference to the attached drawings.

BRIEF DESCRIPTION OF THE DRAWINGS

FIG. 4 represents a view in perspective of the device of FIG. 3, in place in a motor vehicle;

FIG. 8 represents a variant embodiment of the device of FIG. 1;

FIG. 9 represents a view in diagrammatic section of the device of the present invention in a second application;

FIG. 10 represents a variant embodiment of the device of FIG. 9; and

DESCRIPTION OF A PREFERRED EMBODIMENT OF THE INVENTION

Figure 1:
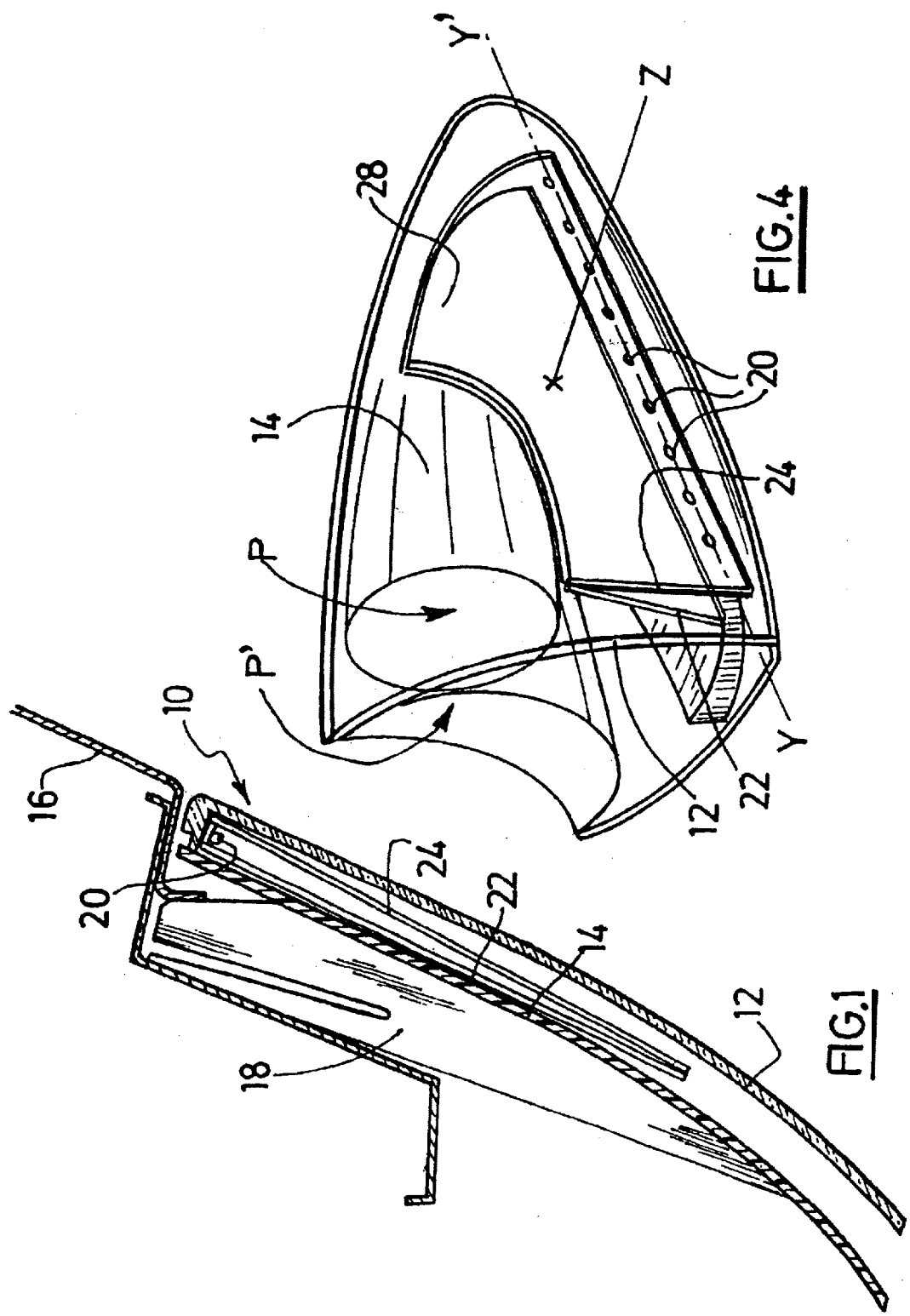
FIG. 1 represents a sectional view of an indicator device for a motor vehicle, incorporating a side-return device in a first application of the present invention.

FIG. 1 represents, in a sectional plane, the side return of an indicator device for a motor vehicle, such as described in the abovementioned document FR-B-2 732 932. This side return, designated overall by the reference 10, comprises glazing 12 and a plinth or housing part 14. Such an indicator device is fixed onto a motor-vehicle bodywork 16, in such a way that the surface of the glazing 12 and that of the bodywork 16 are situated as much as possible in the extension of one another. The means 18 for fixing the side return of the indicator device are described in FR-B-2 732 932 mentioned above, and do not form part of the present invention.

Thus it can well be imagined that the arranging of a lateral repeater lamp in the region lying between the glazing 12 and the housing 14 could pose many installation problems in avoiding any interference with the glazing 12, the housing 14, the bodywork 16 and the fixing means 18.

In accordance with the present invention, these problems are solved by virtue of an indicator device of a novel design, this device having a thickness which is slight by comparison with its length and its height.

Figure 2:
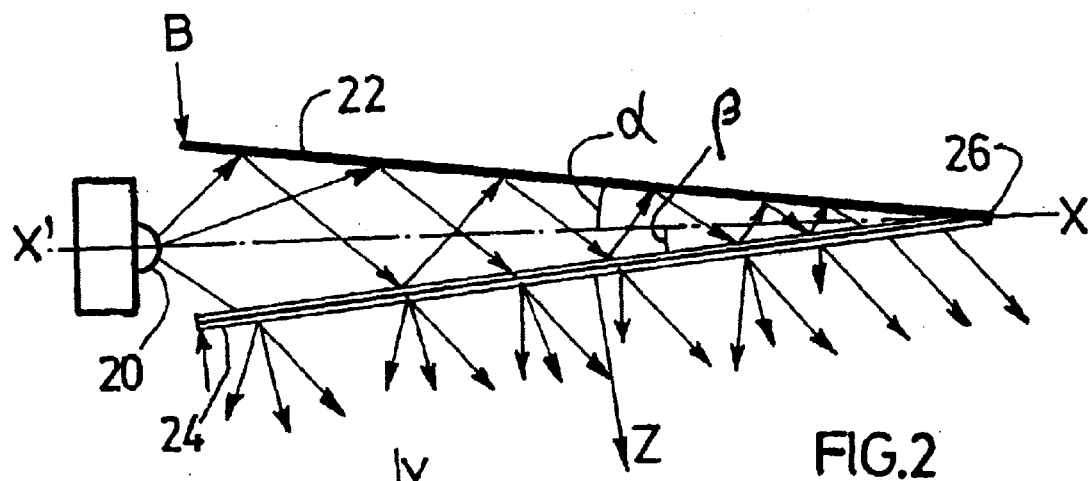
FIG. 2 represents a diagrammatic view in section of the side-return device of FIG. 1.

Such a device is represented diagrammatically in section in FIG. 2. In this figure is seen a light source 20 emitting a light beam in a substantially symmetrical way with respect to a main axis X'-X. A first smooth and continuous screen 22, rectangular for example, is arranged in a first half, situated on one side of the axis X'-X, of the beam emitted by the source 20 in such a way as to form a small angle α, for example less than 10°, with respect to the axis X'-X. The screen 22 constitute the reflecting surface of a reflector.

In the present description, the name "reflector" or "reflecting surface" will be given to any surface procuring at least diffuse reflection.

Figure 11:
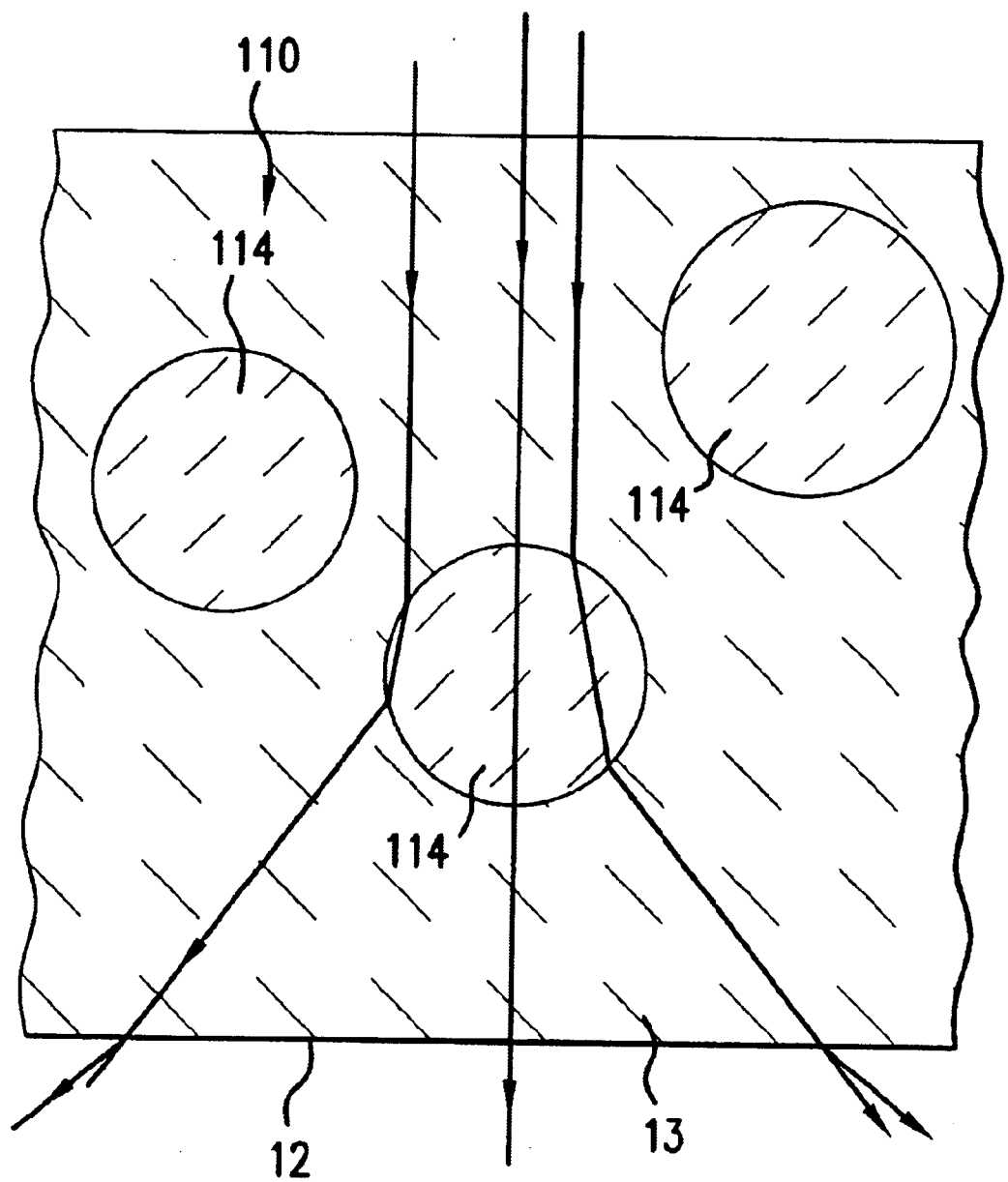
FIG. 11 is a cross section on an enlarged scale, showing the embedded inclusions of the transparent material of the present invention.

The light rays emitted by the source 20 and reflected by the first screen 22 are received by a second flat screen 24, itself also smooth and continuous, arranged in the other half of the beam emitted by the source 20 in such a way as to form a small angle β, for screen example less than 10°, and preferably symmetric with a with respect to the axis X'-X. The 24 is preferably of the same shape, rectangular in this instance, as that of the first screen 22, and it is of transmissive type, the transmission afforded by the screen 24 being accompanied by a diffusion. It would be possible, for example, to provide for the screen 24 to be produced from a first transparent material 110 possessing a first refractive index and in which inclusions 114 are embedded made of a second transparent material possessing a second refractive index different from the first one, as illustrated on FIG. 11. It would also be possible to provided for the first screen 22 to be produced from this same material, the face opposite to the one which is turned towards the light source being metallised in such a way as to be reflecting, the first screen 22 therefore procuring a reflection with diffusion.

According to one embodiment of the present invention, the two screens 22 and 24 are contiguous along a line 26 at their extremity which is furthest from the light source 20, in such a way as to delimit between them a prismatic volume or wedge shape, the angle at the vertex of which is equal to (α+β), and with intersecting edge 26, the light source being arranged in the vicinity of the base B of the prismatic volume thus delimited. In this case, all the light rays emitted by the source 20 in the solid angle of emission of this source are either incident on the first screen 22 and reflected by it, possibly with diffusion, onto the second screen 24, or incident directly on the second screen 24. Moreover, the light rays incident on the second screen 24, whether they originate directly from the source 20 or whether they have previously been reflected by the first screen 22, are partially transmitted with diffusion by the second screen 24 and partially reflected by it towards the first screen 22, which sends them, in its turn, in totality, possibly with diffusion, towards the second screen 24, on which they are again partially transmitted and partially reflected, and so on.

In this way, it is ensured that the totality of the light flux emitted by the source 20 is transmitted through the second screen 24, after having undergone multiple reflections between the first and second screens 22 and 24, these reflections being on each occasion diffuse on the second screen 24, and possibly being so on the first screen 22. It results therefrom that the second screen 24, extending substantially parallel to the direction of the axis X'-X with a slight angle β diffuses the whole of the light flux emitted by the source 20, in practically all directions about a mean direction perpendicular to its plane, that is to say substantially at 80° from the axis X'-X.

This property is valid in the vicinity of the plane of FIG. 2, that is to say of the source plane, defined as being the plane perpendicular to the intersecting edge 26 formed by the screens 22 and 24 and containing the light source 20, the quantity of light transmitted by a portion of the second screen 24 being a decreasing function of the distance between this screen portion and the source plane. The greater the distance from this source plane, the greater the reduction in the quantity of light emitted by the screen 24.

In order for the light diffusion by the second screen 24 to be uniform over the entire surface thereof, that is to say in all the planes parallel to this source plane, it would be possible to use a device providing, from a substantially point light source, a uniform illuminating region of substantial length, for example with the aid of an element distributing the light emitted by the source and of a screen straightening out the rays incident on it into a general direction of emission. Such a device is described in the document FR-A-2 614 969.

Figure 3:
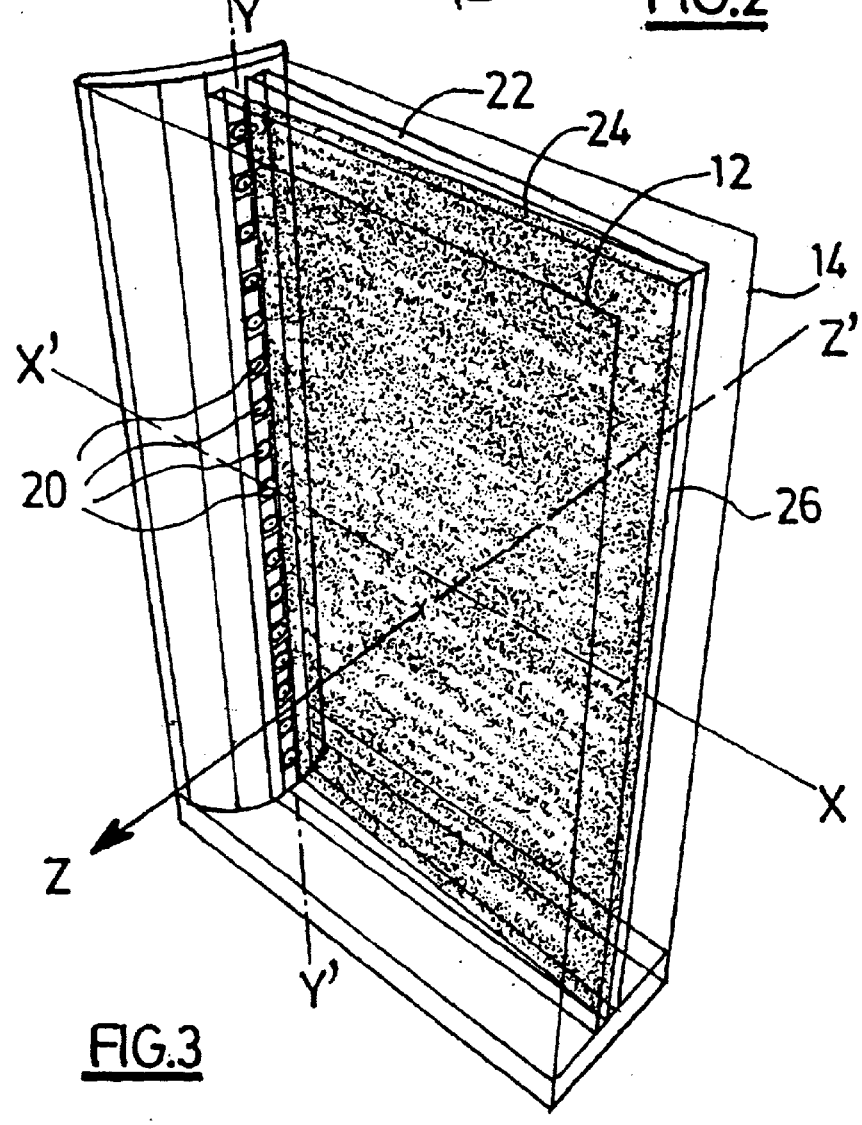
FIG. 3 represents a diagrammatic view in perspective of the device of FIG. 1.

It would also be possible to use several light sources, as has been represented on the diagrammatic view in perspective of FIG. 3, certain parts having been indicated as being transparent for the clarity of the drawing. Each of these sources could be associated with a device providing, for each of them, a uniform illuminating region of substantial length, with the aid of distributor elements and of screens for straightening into a general direction of emission, as described, for example, in the document FR-A-2 776 595.

It is seen in FIG. 3 that several light sources 20 are regularly distributed along an "emission line" Y'-Y, parallel to the intersecting edge 26 formed by the junction between the two screens 22 and 24. Each light source 20 thus contributes, in its individual source plane, as defined above, to the total luminous flux emitted by the screen 24. Such a flux is emitted in a mean direction Z'-Z, about an axis perpendicular to the second screen 24, that is to say forming an angle of about 80° with the axis X'-X. Also represented in FIG. 3 is the glazing 12 of the side return 10 as well as the plinth or housing part 14 which are adjacent to it. Thus it is seen that the lateral repeater lamp function according to the present invention can very easily be installed in the restricted volume between the glazing 12 and the plinth or housing part 14, which is normally unusable, as has been represented in FIG. 1.

Depending on the volume available, or on the effect or the appearance desired, the screens 22 and 24 could have a shape other than rectangular, as has been represented in FIG. 4. A lighting device has been represented in this figure, including, for example, headlamps P and P', the headlamp P' being represented partially. It is seen in this figure that the glazing 12 and the adjacent housing part 14 make it possible to accommodate a lateral-repeater function according to the present invention. This repeater function emits in a mean direction Z'-Z which is substantially parallel to the longitudinal axis of the vehicle, which is itself substantially parallel to the axis Y'-Y. The extremity 28 of the screens 22 and 24 which is remote from the light sources 20 is shaped, on the one hand in order to be able to be accommodated in the space between the housing 14 and the glazing 12, and, on the other hand, in order to have a predetermined aesthetic quality.

Likewise, depending on the volume available, or on the effect or the appearance desired, the screens 22 and 24 could have a shape other than flat, and could be slightly curved.

In order further to reduce the bulk of the device according to the present invention, provision could be made for the first reflecting screen 22 to consist of a portion of the housing 14 itself, as has been represented in FIG. 8. In this case, a surface treatment could be provided for the part of the housing 14 fulfilling the function of first screen 22, in order to augment its reflecting and diffusing power. The elements identical to those which have been described above play the same role, and the device functions identically. A detailed description of FIG. 8 will therefore not be given.

Figure 5:
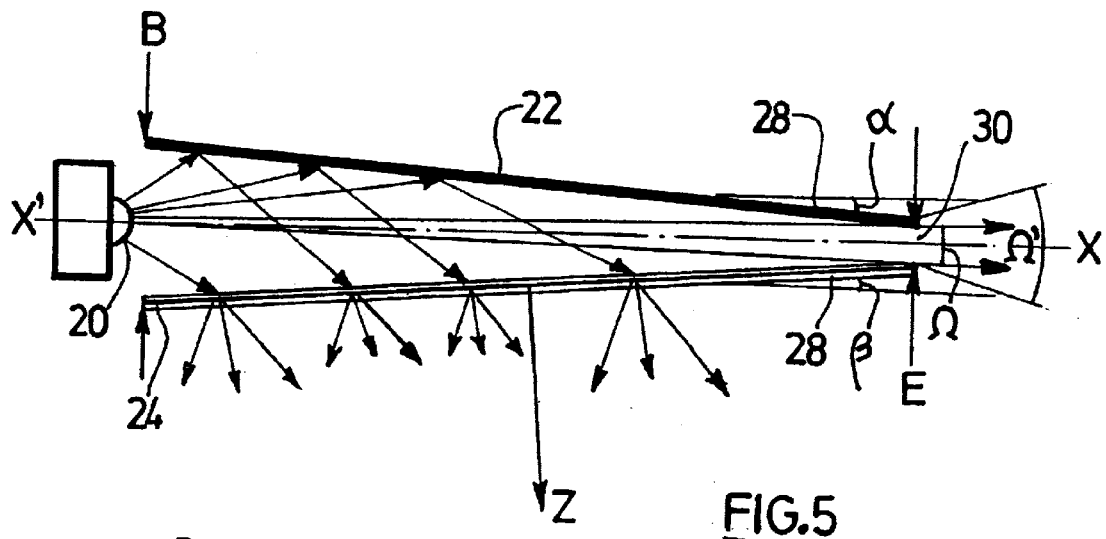
FIG. 5 represents a view similar to that of FIG. 2 of a second embodiment.

According to a second embodiment of the present invention, the extremities of the screens 22 and 24 which are furthest from the light source 20 or from the emission line Y-Y' are non-contiguous, as has been represented in FIG. 5, and are spaced apart by a distance E, in such a way as to form an aperture 30 between them. The screens 22 and 24, as in the preceding embodiment, form slight angles α and β with the mean axis X'-X of emission of the light sources 20, and delimit a prismatic volume between them, truncated level with the aperture 30, the light sources 20 being arranged in the vicinity of the large base B of the truncated prismatic volume, having a length greater than that of the aperture (30).

In this second embodiment, some of the light rays emitted by the source 20 in the solid angle of emission from this source are:
  either received by the first screen 22 and reflected by it,
  or received by the second screen 24 and transmitted with diffusion by the latter to the outside or reflected with diffusion,
  or transmitted directly through the aperture 30.

The light rays transmitted by the second screen 24, whether they originate directly from the source 20 or whether they have previously undergone one or more reflections, are emitted in a mean direction Z'-Z, perpendicular to the screen 24 and substantially perpendicular to the longitudinal axis of the vehicle, as in the preceding embodiment.

The light rays output from the light source 20 and passing directly through the aperture 30 lie within a solid angle Ω, which is symmetric with respect to the axis X'-X, and the value of which depends only on the extent of the source 20 and on the distance E between the extremities 28 of the screens 22 and 24.

The light rays incident on the first or the second screens 22 or 24, whether they are output directly from the light source 20 or whether they have previously been reflected by the second or the first screen 24 or 22 respectively, can also be brought to pass finally through the aperture 30. They then lie within a solid angle $\Omega Q'$, also symmetric with respect to the axis X'-X, and larger than the solid angle $\Omega$. The value of the solid angle $\Omega'$ depends only on the extent of the source 20 and on the angles $\alpha$ and $\beta$ which the screens 22 and 24 form with the axis X'-X.

Furthermore, the luminous intensity of the rays contained in the solid angle $\Omega$, which are output directly from the source 20, is greater than that of the rays contained in the solid angle $\Omega'$, which have undergone at least one reflection on the screens 22 and/or 24.

The second embodiment thus makes it possible to fulfil a second function. This is because it is sufficient to orient the device so that the mean axis of emission X'-X is oriented in such a way as to be substantially parallel to the longitudinal axis of the vehicle. In such a configuration, in addition to the lateral-repeater function, which is performed as in the first embodiment by the light rays transmitted by the second screen 24, the lighting or indicator function is also undertaken by the light rays lying in the solid angles $\Omega$ and $\Omega'$, which are symmetric with respect to the axis X'-X, which is, by assumption, substantially parallel to the longitudinal axis of the vehicle.

For a given light source 20, of given extent and of given brightness, by appropriately choosing the distance E between the extremities 28 of the screens 22 and 24 and the angles $\alpha$ and $\beta$ which these screens 22 and 24 form with the axis X'-X, it will be possible to determine precisely the proportion of the luminous flux emitted by the source 20 which it is desired to find in the solid angle $\Omega$, that which it is desired to find in the solid angle $\Omega'$, and that which it is desired should be transmitted by the second screen in the Z direction. It will therefore be possible, on the one hand, to choose which function it is desired to perform, supplementary to that of the lateral repeater, for example a flashing direction-indicator function or a sidelight function, and, on the other hand, to ensure that this supplementary function will be fulfilled while complying with the regulations in force, the various indicator functions having different regulations as regards the photometry and/or colorimetry. Furthermore, the two functions are thus undertaken by the same light source. They are therefore active or inactive simultaneously, as the regulations require.

The second embodiment could, needless to say, be implemented with the variant embodiment of FIG. 8, the extremity 28 of the second screen 24 being slightly distant from the housing part 14 fulfilling the function of first screen 22.

Figure 6:
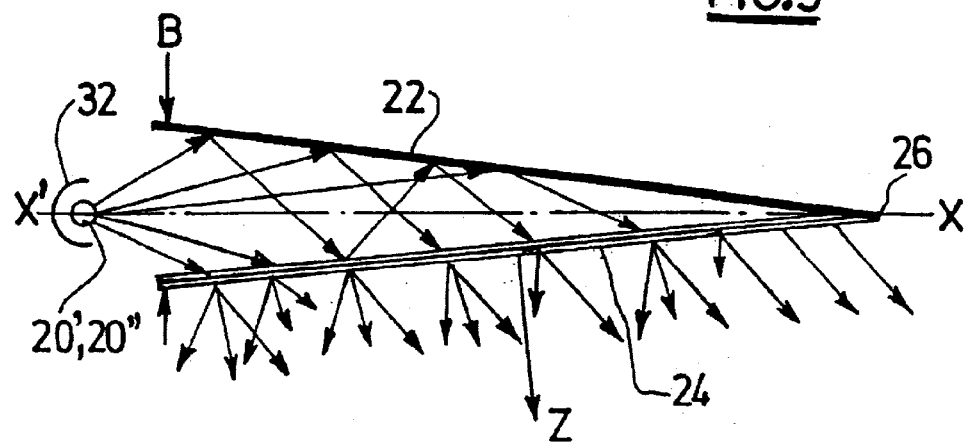
FIG. 6 represents a diagrammatic view of a variant embodiment of the device of FIG. 2.
Figure 7:
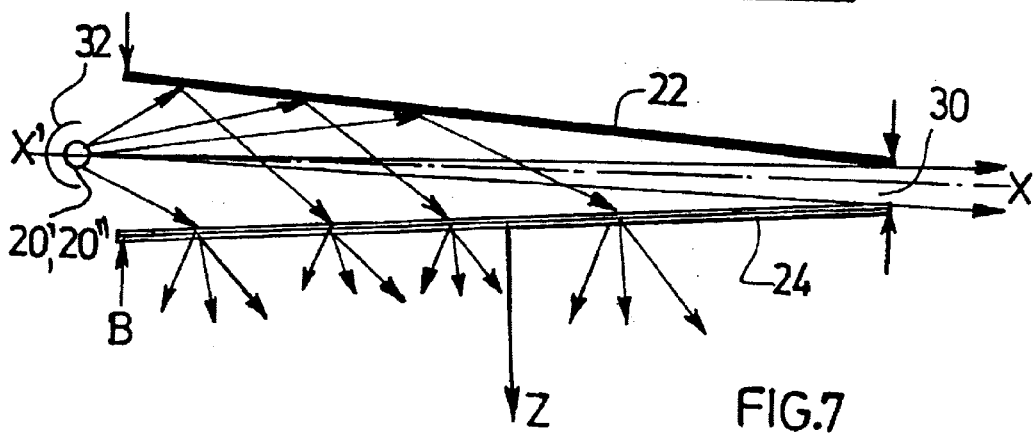
FIG. 7 represents a diagrammatic view of a variant embodiment of FIG. 6 applied to the embodiment of FIG. 5.

The light sources 20 used by the device of the present invention advantageously consist of light-emitting diodes, the size of which easily allows them to be installed between the screens 22 and 24, without increasing the bulk of the device. It would also be possible to use incandescent-filament bulbs 20' regularly distributed along the emission line Y'-Y, or a fluorescent tube 20" such as a neon tube, extending in a continuous way along this emission line Y'-Y, as has been represented in FIGS. 6 and 7. In both these cases, it would be possible advantageously to use a recuperator mirror 32, in order to recover the flux emitted by the bulb 20' or the tube 20" in a direction opposite to the intersecting edge 26 or to the aperture 30 and to redirect it in this direction. In the case in which light-emitting diodes or incandescent-filament bulbs are used, it would be possible to combine them with a device providing, for each of them, a uniform illumination range of substantial length, with the aid of distributor elements and of screens for straightening into a general emission direction, as described, for example, in the documents FR-A-2 614 96 or FR-A-2 776 595 mentioned above.

Other cases may arise in which the space available is not sufficient to install a lighting or indicator function. This is the case, for example, when several functions have to be grouped together into the same assembly. The present invention makes it possible to solve such problems.

In FIG. 9 has been represented a vehicle lamp 50, in front of which has been placed a device 10 as described above. The lamp 50 comprises a bulb 51 equipped with an incandescent filament 52 situated in the region of the focus of a flux-recuperator parabolic mirror 60. The latter directs essentially parallel radiation onto the rear face of the first screen 22 of the device 10 according to the present invention. In this application, the first screen 22 is produced in transparent-plate form, so that the parallel radiation generated by the mirror 60 passes through this screen 22 and arrives on the second screen 24, and it is transmitted by this screen 24 with diffusion, as was explained above. The second screen 24 is made of a materials such that the beam diffused by it appropriately fulfils the photometric requirements.

When the radiation leaving the lamp 50 has to be colored, depending on the function which it fulfils, this coloring can be given, for example, by the glass 53 of the bulb 51, by the material of the first screen 22 tinted in an appropriate way, or else by an intermediate screen 54 interposed between the mirror 60 and the first screen 22.

The function fulfilled by the lamp 50 is therefore not modified by the presence of the device 10 according to the present invention. This device functions as was seen above. When the light source or sources 20 are lit, the luminous flux, after multiple reflections on the opposing faces of the screen 22 and 24, emerges from the device around a mean direction Z perpendicular to the second screen 24.

The angle $\alpha$ which the first screen 22 forms with the main axis of emission X'-X of the source 20 will preferably be chosen, depending on the material constituting this screen 22, such that the light rays output directly from the source 20 undergo total reflection on the screen 22, and the angle $\beta$ between the second screen 24 and the main axis X'-X will be chosen, depending on the material constituting this screen 24, so that the light rays output directly from the source 20 can penetrate into the screen 22. Furthermore, the light rays which, after multiple reflections, could pass through the transparent screen 22, would then be received by the mirror 60 and sent back to the screen 22. It is therefore ensured that the whole of the luminous flux emitted by the source 20 will be transmitted by the second screen 24.

If the colorimetry of the lamp 50 is obtained by the coloring of the material of the first screen 22, the color of the beam emerging from the device 10, when the light sources 20 are lit and when the bulb 51 is turned off, will be influenced by the color of the first screen 22. If it is desired that the functions of the lamp 50 and of the device 10 be of different colors, it is sufficient for the color of the beam from the lamp 50 to be obtained by the glass 53, an intermediate screen 54, or a tint carried by the face of the first screen 22 turned towards the bulb 51.

In this way, when only the light sources 20 are lit, a luminous flux will be emitted through the second screen 24 in the Z direction, as was seen above, the color of this flux being fixed by that of the sources 20. When only the bulb 51 is lit, the luminous flux reflected by the mirror 60 will also be emitted through the second screen 24 in the Z direction, the color of this flux being fixed by the glass 53 or an intermediate screen 54. It results therefrom that the functions of the lamp 50 and of the device could be perfectly differentiated by their color or their luminous intensity. The luminous intensity emitted by the bulb 51 will be greater than that of the light source or sources 20, in such a way that, when the light sources 20 and 52 are lit simultaneously, the total luminous flux meets the regulatory photometric requirements for the function fulfilled by the lamp 50.

The device 10 could, for example, fulfil the function of vehicle rear sidelight, and the lamp 50 be a stop light, the photometry and colorimetry of these two functions each being in accordance with the regulations. By virtue of the invention, it is thus possible for the same portion of the surface of the second screen 24 to emit different light beams fulfilling different functions. The assembly in which the lamp 50 and the device 10 are housed could therefore be of a smaller size.

One advantage offered by the invention resides in the fact that the second, diffusing screen 24 prevents the space situated behind it being seen distinctly. In this way, a tinted element intended to give its specific color to the light beam to be generated will be barely noticeable or invisible from the outside, so as thus to form a lighting and indicator device of essentially uncolored outward appearance, as the stylists frequently want it to be. For example, several lamps 50 could be installed behind a single device 10, each lamp fulfilling its function, and the individual lamps be scarcely noticeable or invisible from the outside.

FIG. 10 illustrates another embodiment, according to which the light-diffusion function, by way of the second screen 24 as was seen above, and configurations for deviating the light by refraction, by way of the first screen 22, which is transparent in this embodiment as was seen above, are combined in the device 10. In the example represented, these take the form of toroidal features 70, formed on the face of the first screen 22 turned towards the lamp 50, and intended specifically to cause a spreading of the light beam which is combined with the diffusion achieved by the second screen 24.

In that way, the beam obtained for the motor-vehicle lamp 50 will result from the combination of the deflections caused within the tori 70 and of the diffusion caused by the second screen 24. Advantageously, with some of the deflection being caused by the second screen 24, the manufacturing tolerances of the tori could be wider than in the case of the conventional, solely deflecting, glazing, in which the tori themselves have to provide all of the distribution of the generally parallel beam supplied by the mirror 60.

There has therefore been produced, according to one aspect of the present invention, in a lighting or indicator device of the type including a part forming a side return, a light source of sufficiently slight thickness as to be able to be arranged in this part forming the side return in such a way as to form a lateral-repeater device. This lateral-repeater device is, moreover, particularly simple to assemble by itself, as well as in the part forming the side return, it is reliable in its operation, and its photometric performance meets the regulations in force, and it is particularly inexpensive. According to one aspect of the present invention, a light source has been produced having a defined function and of a thickness which is sufficiently slight as to be able to be arranged in front of a lighting or indicator device having another defined function, without a substantial increase in the bulk of this lighting or indicator device.

Needless to say, the present invention is not limited to the embodiments which have been described, but, on the contrary, the person skilled in the art could apply numerous modifications to it, which fall within its scope. Thus, for example, when only the lateral-repeater function is used, the light source or sources could be arranged in any direction, horizontal, vertical or oblique, depending on the volume available and/or on the aesthetic effect sought. Likewise, the first and second screens could be substantially flat, that is to say slightly curved, depending on the volume available and/or on the aesthetic effect sought. Thus, further, the light source or sources, as well as the first and/or the second screen could be colored, depending on the function for which the lateral repeater is desired. The color amber could, for example, be chosen to form a lateral repeater of a direction-indicator flasher. The device according to the present invention could also be used to provide the interior lighting of a motor vehicle, in the case in which the space available for the installation of such lighting is limited, or in the case in which it might be desired to obtain a particular lighting quality. Finally, there are cases in which the second screen could consist of the glazing of the lighting or indicator device itself, or of a part of this glazing.

What is claimed is:

1. Lighting or indicator device for a motor vehicle, including at least one light source, a reflector and a light-diffusing plate, wherein said reflector and said light-diffusing plate consist of smooth, continuous and substantially flat elements forming a non-zero angle less than 20° between them and delimiting between them a substantially prismatic volume, the light source being arranged in the vicinity of a base of the prismatic volume.

2. Lighting or indicator device according to claim 1, wherein an extremity of the reflector and an extremity of the light-diffusing plate which are furthest from the base of the prismatic volume are contiguous.

3. Lighting or indicator device according to claim 1, wherein an extremity of the reflector and an extremity of the light-diffusing plate which are furthest from the base of the prismatic volume are space by a length less than the length of the base of the prismatic volume.

4. Lighting or indicator device according to claim 1, wherein the light-diffusing plate is produced from a first transparent material possessing a first refractive index and in which are embedded inclusions made of a second transparent material possessing a second, different, refractive index.

5. Lighting or indicator device according to claim 1, wherein the reflector is produced in the form of a transparent plate.

6. Lighting or indicator device according to claim 5 wherein the light is deflected by the face of the reflector which is furthest from the light source.

7. Lighting or indicator device according to claim 5, wherein that transparent plate forming the reflector is traversed by the light originating from a second light source.

8. Lighting or indicator device according to claim 7, wherein the second light source interacts with a mirror so as to constitute a lamp.

9. Lighting or indicator device according to claim 1, wherein the light source, the reflector and the light-diffusing plate are arranged in a housing, and the reflector consists of a portion of the housing.

10. Lighting or indicator device according to claim 1, wherein the reflector is produced in the form of a plate made from a first transparent material possessing a first refractive index and in which inclusions are embedded made of a second transparent material having a second, different, refractive index.

11. Lighting or indicator device according to claim 7, wherein one face of the plate forming the reflector opposite to that which is turned towards the light source is coated with a light-reflecting material.

12. Lighting or indicator device according to claim 1, wherein the light source comprises of a plurality of light-emitting diodes.

13. Lighting or indicator device according to claim 1, wherein the light source comprises of a plurality of incandescent bulbs.

14. Lighting or indicator device according to claim 1, wherein the light source comprises of a fluorescent tube.

* * * * *